United States Patent [19]

Skafvenstedt et al.

[11] 4,053,901

[45] Oct. 11, 1977

[54] FLUID PUMP FOR A WRITING DEVICE HAVING AN AIR EJECTOR FEATURE

[75] Inventors: Bengt Skafvenstedt, Stockholm; Sture Ahlgren, Vaellingby; Eberhard Tschuertz, Jaerfaella, all of Sweden

[73] Assignee: Siemens Aktiengesellschaft, Berlin & Munich, Germany

[21] Appl. No.: 745,573

[22] Filed: Nov. 29, 1976

[30] Foreign Application Priority Data

Dec. 22, 1975 Germany ............................ 2557961

[51] Int. Cl.[2] ........................ G01D 15/16; B43K 5/04; B43K 5/18; F04B 21/00

[52] U.S. Cl. ................................ 346/140 R; 401/145; 401/150; 417/435

[58] Field of Search ............ 346/75, 140 R; 401/145, 401/150; 417/435, 489

[56] References Cited

U.S. PATENT DOCUMENTS 3,614,940 10/1971 Abrams et al. ............... 346/140 UX

*Primary Examiner*—George H. Miller, Jr.
*Attorney, Agent, or Firm*—Hill, Gross, Simpson, Van Santen, Steadman, Chiara & Simpson

[57] ABSTRACT

A pump mechanism for pumping ink or similar writing fluid from a fluid reservoir to a writing device. A piston is moved in a cylinder in one direction to draw ink into the cylinder from a reservoir through a capillary tube, and is moved in an opposite direction to discharge the ink to a writing device while at the same time, in cooperation with a flexible membrane located in the cylinder and connected to the piston, to discharge any air in the capillary tube back into the reservoir.

3 Claims, 1 Drawing Figure

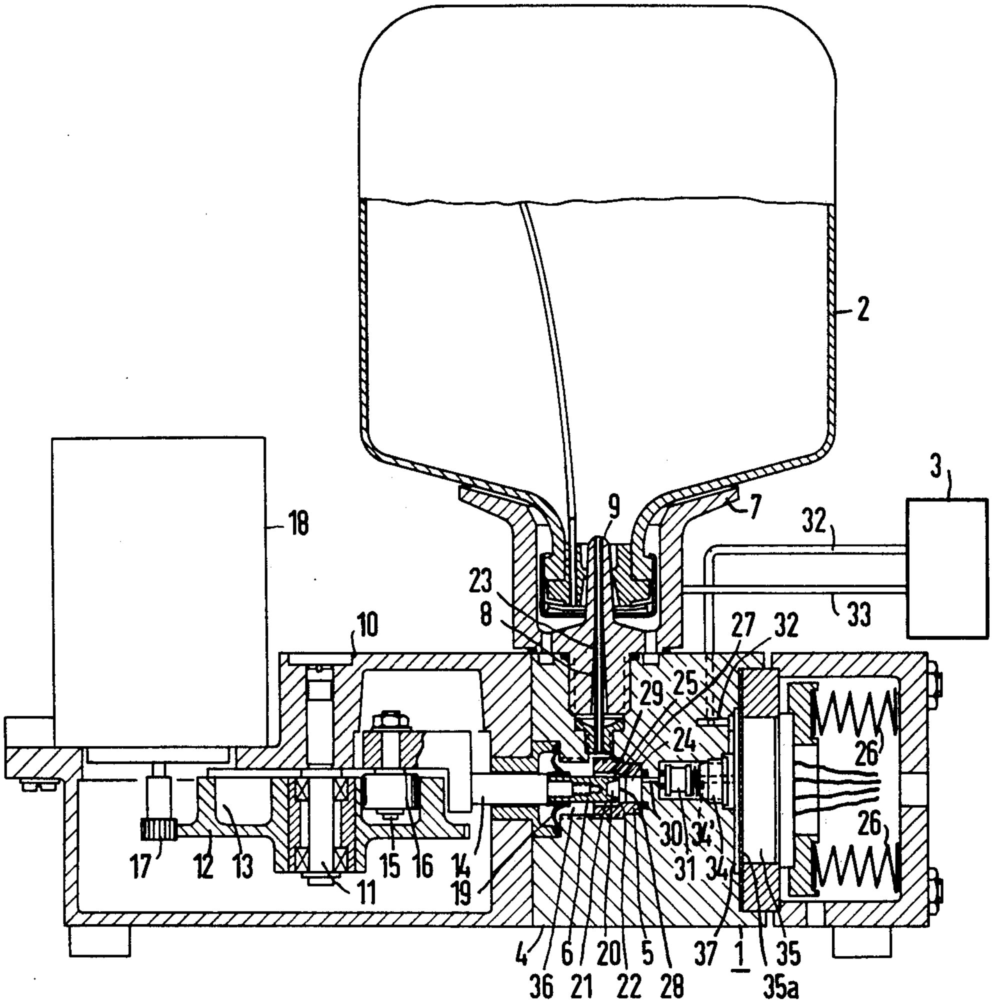
2
3
32
33
7
9
18
23
8
10
27
32
29
25
24
26
26
17
12
13
15
16
14
11
19
30
34'
31
34
4
6
20
5
37
1
35
36
21
22
28
35a

FLUID PUMP FOR A WRITING DEVICE HAVING AN AIR EJECTOR FEATURE

BACKGROUND OF THE INVENTION

This invention relates generally to pump mechanisms and particularly to a pump mechanism for delivering ink or similar writing fluid from a reservoir to a writing device. The pump mechanism includes a piston slidably carried within a cylinder for reciprocatory movement to alternately draw ink from the reservoir into the cylinder and then to discharge the ink from the cylinder to the writing device.

In known pumping mechanisms of this general type and for this general purpose, a control mechanism such as a photo cell is provided to deenergize the pump when the ink in the reservoir is almost exhausted, thereby preventing entry of air bubbles into the inking system. Then, for drawing fresh ink into the inking system after the reservoir has been filled, manual suction and pressure pumps are provided.

These control mechanisms and manually operated pumps are complicated in design, expensive to manufacture and space consuming. In addition, the operation of the manual pumps is difficult and the entire pump mechanism is inoperative if air has become entrained therein.

SUMMARY OF THE INVENTION

An object of the present invention is to provide a pump mechanism of the type generally described which can be filled without air and is relatively simple in design and inexpensive in manufacture.

Briefly, the present invention involves a pump mechanism in which a piston is moved in one direction in a cylinder to draw ink into the cylinder from the reservoir through a capillary tube, and is moved in an opposite direction to discharge the ink to a writing device while at the same time, in cooperation with a flexible membrane connected to the cylinder and to the piston, discharge any air in the capillary tube back into the reservoir. Thus, when the ink and the reservoir is exhausted, a fresh supply can be added to the reservoir and the pump mechanism energized. The pump mechanism will draw the ink from the reservoir and deliver it to the writing device, while at the same time ejecting any air which was drawn into the pump mechanism back into the reservoir.

Many other objects, advantages and features of the present invention will become manifest to those skilled in the art upon making reference to the drawing attached hereto and the following description of the preferred embodiment.

BRIEF DESCRIPTION OF THE DRAWING

The drawing is a vertical sectional view of a pump mechanism constructed in accordance with the principles of the present invention.

DESCRIPTION OF THE PREFERRED EMBODIMENT

Referring to the drawing, there is disclosed a pump mechanism indicated generally at reference numeral 1 constructed in accordance with the present invention for delivering a writing or a printing fluid such as ink or the like from a reservoir 2 to a writing device 3. The writing system may be of the type disclosed, for example, in U.S. Pat. No. 2,566,443.

The pump mechanism 1 comprises a pump housing 4 having an upwardly extending mounting collar 7 for supporting the reservoir 2. The collar 7 comprises a thin elongated protuberance 9 which is apertured as at 8 to receive a capillary tube 23. The capillary tube 23 is preferably made of glass.

Formed within the housing 4 is a cylinder 5 in which is disposed for slidable reciprocatory movement a one-piece plastic piston 6.

Also provided is a drive mechanism for moving the piston 6 forward and backward in reciprocating motion. The drive mechanism comprises a toothed wheel or gear 12 which is mounted for rotation on a shaft 11 which is journalled on a gear housing 10. A cam follower groove 13 is formed in the gear 12 for receiving a cam follower 16 rotatably mounted on a shaft 15 which is connected for joint reciprocatory movement to the piston 6 by virtue of a piston rod 14. The gear 12 is rotated by means of a pinion gear 17 mounted on the shaft of a suitable driving mechanism such as an electric motor indicated at reference numeral 18.

Also connected to the piston 6 is a flexible membrane 19 disposed within the cylinder 5 and connected at one portion to the housing 4 and at an opposite portion to the piston 6 for joint reciprocatory movement therewith. As will be understood by those skilled in the art, the membrane 19 effectively seals the interior of the pump housing 4 from the gear housing 10.

A recess or cavity 20 is formed in the front wall 28 of the piston 6. In addition, a cylinder wall 29 which forms the cylinder 5 comprises a frusto-conical tapered portion 25 which tapers inwardly in a direction away from the piston 6. As the piston 6 moves forward in a pumping stroke in the direction of the tapered portion of the cylinder wall 25, an outer surface 21 of a forward end portion 22 of the piston 6 engages the tapered cylinder wall portion in sealing relation as the piston is resiliently deformed.

The flexible membrane 19 and the end portion 22 of the piston 6 operate as a vacuum pump in drawing ink from the reservoir 2 through the capillary tube 23 and into a suction chamber 36 of the cylinder 5. Thus, as the piston 6 is moved backward during a suction stroke (that is, lefwardly as viewed in the drawing) the movement of the flexible membrane 19 creates a vacuum condition in the suction chamber 36. The ink is drawn through the capillary tube into the suction chamber 36 and also into a pumping chamber 24, located on the opposite side of the piston 6 in the cylinder 5, after the forward end portion 22 of the piston 6 moves out of engagement with the tapered portion 25 of the cylinder wall 29. A gap or space 27 is formed between the forward end of the piston 6 and the tapered portion 25 of the cylinder wall 29 as the piston 6 moves backward through its suction stroke.

The cam follower groove 13 formed in the gear 12 is constructed and arranged such that the piston 6 is moved backward during a suction stroke at a speed which is much less than the forward speed of the piston 6 as it moves through a pumping stroke. As a consequence the pressure drop of the ink as it is drawn through the capillary tube 23 and into the suction chamber 36 and the pumping chamber 24 is substantially reduced.

As the piston 6 is moved in a forward direction during a pumping stroke, the outer surface 21 of the forward end portion 22 of the piston 6 moves into sealing and sliding engagement with the tapered portion 25 of the cylinder wall 29. The forward end 22 of the piston 6 is resiliently deformed radially inwardly as the piston moves forward and forces the ink from the pumping chamber 24 to the writing device 3.

As the ink is delivered from the pumping chamber 24 to the writing device 3 it passes through a conduit 30 and a spring-loaded valve 31 through a chamber 37, from which it passes through a conduit 32 to the writing device 3. The valve 31 is mounted on a threaded member 34 apertured as at 34'. One wall of the chamber 37 is formed by a membrane $35_a$ which is held in place by an element 35 which is spring-biased in the direction of the membrane $35_a$ by means of a plurality of spring members 26. The flexible membrane $35_a$ performs the function of maintaining a constant pressure of the ink as it is delivered from the pumping chamber 24 to the writing device 3.

Excess ink which is delivered to the writing device 3 but which is not used is transferred back to the reservoir 2 by means of a return conduit 33.

Referring again to the plastic membrane 19, that portion thereof which is fixedly connected to the piston 6 reciprocates therewith, and as the piston is moved forward during a pumping stroke a positive pressure is produced in the chamber 36 between the membrane 19 and the piston 6, and any air bubbles present in the supply aperture 8 or the capillary 23 are forced upwardly through the capillary and into the reservoir 2.

In the event the supply of ink in the reservoir 2 is exhausted, the pump mechanism 1 can establish a supply of ink to the writing device 3 without the aid of manual pumps for the purpose of removing entrapped air bubbles in the ink.

For example, assuming that a fresh supply of ink has been added to the reservoir 2, the piston 6 and the flexible membrane 19 will draw ink and air into the suction chamber 36 as the piston moves backward during a suction stroke. As the piston 6 moves forward, however, the flexible membrane 19 forces any air in the chamber 36 back through the capillary tube 23 into the reservoir 2. Thus, after the piston has reciprocated through a few pumping strokes, the supply of ink to the writing device 3 has been resumed, and all entrapped air bubbles have been removed from the pump mechanism 1 and returned back to the reservoir 2.

Although minor modifications might be suggested by those versed in the art, we wish to employ within the scope of the patent warranted hereon all such modifications as reasonably and properly come within this scope of our contribution to the art.

We claim:

1. A pump mechanism for delivering ink or the like writing fluid from a fluid reservoir to a writing device comprising pump housing means, means forming a cylinder in said housing comprising a suction chamber and a pumping chamber, a piston carried within said cylinder and movable in a forward direction to block communication between said suction and pumping chambers, and in a backward direction to open communication between said suction and pumping chambers, means including a capillary tube for communicating said suction chamber and the reservoir, and flexible membrane means in said cylinder having a portion connected to said pump housing means and another portion connected to said piston for joint movement therewith, whereby said flexible membrane means forces air bubbles from said capillary tube to the reservoir as the piston moves in said forward direction.

2. The invention as defined in claim 1 wherein said capillary tube is made of glass.

3. The invention as defined in claim 1 wherein said pump housing means comprises an apertured protuberance for receiving the reservoir in assembled relation and wherein said capillary tube is disposed within the aperture of said protuberance.

* * * * *